US011309786B2

(12) United States Patent
Karimi et al.

(10) Patent No.: US 11,309,786 B2
(45) Date of Patent: Apr. 19, 2022

(54) CONTROLLER FOR POWER INVERTER

(71) Applicants: POLYVALOR, LIMITED PARTNERSHIP, Montréal (CA); Mississippi State University, Mississippi State, MS (US)

(72) Inventors: Houshang Karimi, Montreal (CA); Masoud Karimi-Ghartemani, Starkville, MS (US); Keyhan Sheshyekani, Montreal (CA)

(73) Assignees: POLYVALOR, LIMITED PARTNERSHIP, Montreal (CA); MISSISSIPPI STATE UNIVERSITY

( * ) Notice: Subject to any disclaimer, the term of this patent is extended or adjusted under 35 U.S.C. 154(b) by 0 days.

(21) Appl. No.: 17/265,432

(22) PCT Filed: Aug. 2, 2019

(86) PCT No.: PCT/CA2019/051065
§ 371 (c)(1),
(2) Date: Feb. 2, 2021

(87) PCT Pub. No.: WO2020/024064
PCT Pub. Date: Feb. 6, 2020

(65) Prior Publication Data
US 2021/0305890 A1    Sep. 30, 2021

Related U.S. Application Data

(60) Provisional application No. 62/713,625, filed on Aug. 2, 2018.

(51) Int. Cl.
*H02M 1/14* (2006.01)
*H02M 1/44* (2007.01)
(Continued)

(52) U.S. Cl.
CPC ............. *H02M 1/143* (2013.01); *H02M 1/44* (2013.01); *H02M 7/537* (2013.01)

(58) Field of Classification Search
CPC .......... H02M 1/14; H02M 1/143; H02M 1/15; H02M 1/44; H02M 7/4803; H02M 7/5387;
(Continued)

(56) References Cited

U.S. PATENT DOCUMENTS 9,906,119 B2 *   2/2018   Chen ..................... H02M 7/797
2014/0204633 A1  7/2014   Khajehoddin et al.
(Continued)

FOREIGN PATENT DOCUMENTS

CN    102598455 A       7/2012
WO    WO2011/0322867    3/2011

OTHER PUBLICATIONS

Olivares et al., "Trends in Microgrid Control", IEEE Transactions on Smart Grid, vol. 5, No. 4, pp. 1905-1919, Jul. 2014.
(Continued)

*Primary Examiner* — Gary L Laxton
(74) *Attorney, Agent, or Firm* — Norton Rose Fulbright Canada LLP

(57) ABSTRACT

Herein provided is a controller for a current inverter. The controller comprises a reference generator configured for obtaining source voltage and current values from an electrical source, generating a voltage error function based on source and reference voltages, and generating a current error function based on source and reference currents. The controller also comprises an output controller for receiving from the reference generator the voltage and current error functions and configured for producing at least one control signal based on the voltage and current error functions. The controller also comprises a state feedback controller configured
(Continued)

for: adjusting the at least one control signal, based on parameters of the electrical source, to produce at least one adjusted control signal, and outputting the at least one adjusted control signal to the current inverter.

20 Claims, 6 Drawing Sheets

(51) Int. Cl.
*H02M 7/537* (2006.01)
*H02M 7/5395* (2006.01)

(58) Field of Classification Search
CPC ............. H02M 7/53871; H02M 7/539; H02M 7/53995
See application file for complete search history.

(56) References Cited

U.S. PATENT DOCUMENTS

| | | | | |
|---|---|---|---|---|
| 2016/0285355 | A1* | 9/2016 | Lee | H02M 1/15 |
| 2019/0058395 | A1* | 2/2019 | Tayebi | H02M 7/44 |
| 2019/0229609 | A1* | 7/2019 | Li | H02M 7/4826 |

OTHER PUBLICATIONS

Karimi et al., "Multivariable Servomechanism Controller for Autonomous Operation of a Distribued Generation Unit: Design and Performance Evaluation", IEEE Transactions on Power Systems, vol. 25, No. 2, pp. 853-865, May 2010.

Khajehoddin et al., "Optimal and Systematic Design of Current Controller for Grid-Connected Inverters", IEEE Journal of Emerging and Selected Topics in Power Electronics, vol. 6, No. 2, pp. 812-824, Jun. 2018.

Karimi-Ghartemani et ai., "Universal Controller for Three-Phase Inverters in a Microgrid", IEEE Journal of Emerging and Selected Topics in Power Electronics, vol. 4, No. 4, pp. 1342-1353, 2016.

C. F. Nascimento et al., "Analysis of Noncharacteristic Harmonics Generated by Voltage-Source Converters Operating Under Unbalanced Voltage," in IEEE Transactions on Power Delivery, vol. 32, No. 2, pp. 951-961, Apr. 2017.

R. Ramos, "Film Capacitors in Power Applications: Choices and Particular Characteristics Needed," in IEEE Power Electronics Magazine, vol. 5, No. 1, pp. 45-50, Mar. 2018.

T. Keim, "Electrolytics and Film Capacitors Continue to Evolve [Happenings]," in IEEE Power Electronics Magazine, vol. 5, No. 1, pp. 12-16, Mar. 2018.

Q. C. Zhong, W. L. Ming, X. Cao and M. Krstic, "Control of Ripple Eliminators to Improve the Power Quality of DC Systems and Reduce the Usage of Electrolytic Capacitors," in IEEE Access, vol. 4, pp. 2177-2187, 2016.

A. Yazdani and R. Iravani, "A unified dynamic model and control for the voltage-sourced converter under unbalanced grid conditions," in IEEE Transactions on Power Delivery, vol. 21, No. 3, pp. 1620-1629, Jul. 2006.A.

International Search Report issued in PCT application No. PCT/CA2019/051065.

\* cited by examiner

CONTROLLER FOR POWER INVERTER

CROSS REFERENCE TO RELATED APPLICATIONS

This patent application claims priority of U.S. provisional Application Ser. No. 62/713,625, filed on Aug. 2, 2018, the entire contents of which are hereby incorporated by reference.

TECHNICAL FIELD

The present disclosure relates generally to power networks, and more particularly to controllers for power inverters.

BACKGROUND

Power inverters, sometimes called current inverters, are devices which serve to convert direct current (DC) into alternating current (AC). Conventional approaches to power inverters use voltage-source converters to shape a DC input from a power source into a sinusoidal AC output for transmission, for example to a larger power network. Voltage-source converters typically involve a plurality of switched elements, such as transistors, which are operated by a controller of the current inverter to produce the sinusoidal AC output.

With the proliferation of distributed energy resources (DER) such as small-scale wind generation operations and solar panel roofing on individual homes there is an increase in demand for power inverters, for instance to allow small-scale power generation operations to sell excess production to the wider electrical grid. However, strict regulations are mandated on the quality of power which can be provided to the grid, including relating to DC ripple levels, harmonics levels, voltage sag and swell, and power flickers. Existing approaches for power inverters may not be adequate for use with DERs to provide excess production to the grid.

There may be a need for power inverters, and controllers therefor, which address at least some of these issues.

SUMMARY

In accordance with at least some broad aspects, there is provided a controller for a current inverter, the current inverter coupled to an electrical source and producing output current for a receiving network, the controller comprising: a reference generator configured for: obtaining a source voltage value and a source current value from the electrical source, generating a voltage error function based on the source voltage value and a reference voltage, and generating a current error function based on the source current value and a reference current; an output controller coupled to the reference generator for receiving therefrom the voltage error function and the current error function and configured for producing at least one control signal based on the voltage error function and the current error function; and a state feedback controller coupled to the output controller and to the electrical source, the state feedback controller configured for: adjusting the at least one control signal, based on a DC ripple level of the electrical source, a double-frequency ripple level of the electrical source, and a DC voltage of the electrical source, to produce at least one adjusted control signal, and outputting the at least one adjusted control signal to the current inverter.

In some embodiments, the reference generator comprises: a ripple extractor comprising a first-order high-pass filter having a transfer function of $$\frac{s}{s+a};$$

and a phase shift unit comprising a first-order all-pass filter having a transfer function of $$\frac{s-b}{s+b};$$

wherein s is the Laplace-domain variable, and a and b are predetermined constants; and wherein the reference current is produced by the ripple extractor and the phase shift unit.

In some embodiments, the reference current is produced based on the equation $i_{tq}(t) = I_{tq_0} + I_{tq_2} \sin(2\omega t)$ in which $i_{tq}(t)$ is the reference current, $I_{tq_0}$ is a base reference current, $i_{tq_2}$ is a feedback current, and $\omega$ is the frequency of the reference current.

In some embodiments, the reference generator is further configured for producing the reference voltage.

In some embodiments, the output controller comprises: a servo-compensator configured for producing at least one uncompensated control signal based on the voltage error function and the current error function; and a gain unit configured for compensating at least one uncompensated control signal based on state variables of the servo-compensator to produce the at least one control signal.

In some embodiments, wherein the output controller is configured for producing a plurality of control signals based on core matrices $A_C$ and $B_C$, where $$A_C = \begin{bmatrix} 0 & 1 & 0 \\ 0 & 0 & 1 \\ 0 & -4\omega^2 & 0 \end{bmatrix}, B_c = \begin{bmatrix} 0 \\ 0 \\ 1 \end{bmatrix},$$

and where $\omega$ is the frequency of the reference current.

In some embodiments, the state feedback controller is further configured for: receiving, from a phase-locked loop associated with the current inverter, an indication of the phase angle of the receiving network; and adjusting the at least one control signal based on the phase angle of the receiving network.

In some embodiments, the state feedback controller is further configured for adjusting the at least one control signal in accordance with a maximum power point tracking strategy.

In some embodiments, the controller further comprises a system gain coupled to the state feedback controller and configured for: obtaining the at least one adjusted control signal; adjusting the at least one adjusted control signal to produce at least one further-adjusted control signal; and outputting the further-adjusted control signal to the current inverter.

In some embodiments, the at least one adjusted control signal output to the current inverter causes the current inverter to produce unbalanced current as the output current.

In accordance with at least some other broad aspects, there is provided a method for controlling a current inverter, the current inverter coupled to an electrical source, controlled by a controller, and producing output current for a receiving network, the method comprising: obtaining a source voltage value and a source current value; generating a voltage error function based on the source voltage value and a reference voltage; generating a current error function based on the source current value and a reference current; producing at least one control signal based on the voltage and current error functions; adjusting the at least one control signal based on a DC ripple level of the electrical source, a double-frequency ripple level of the electrical source, and a DC voltage of the electrical source to produce at least one adjusted control signal; and outputting the at least one adjusted control signal to the current inverter.

In some embodiments, the method further comprises producing the reference current via a ripple extractor and a phase shift unit.

In some embodiments, producing the reference current comprises producing the reference current based on the equation $i_{tq}(t)=i_{tq_0}+i_{tq_2} \sin(2\omega t)$ in which $i_{tq}(t)$ is the reference current, $i_{tq_0}$ is a base reference current, $i_{tq_2}$ is a feedback current, and to is the frequency of the reference current.

In some embodiments, the method further comprises producing the reference voltage.

In some embodiments, producing at least one control signal comprises: producing at least one uncompensated control signal based on the voltage error function and the current error function; and compensating the at least one uncompensated control signal based on state variables of a servo-compensator associated with the controller to produce the at least one control signal.

In some embodiments, producing the at least one control signal comprises producing a plurality of control signals based on core matrices $A_C$ and $B_C$, where $$A_C = \begin{bmatrix} 0 & 1 & 0 \\ 0 & 0 & 1 \\ 0 & -4\omega^2 & 0 \end{bmatrix}, B_C = \begin{bmatrix} 0 \\ 0 \\ 1 \end{bmatrix},$$

and where $\omega$ is the frequency of the reference current.

In some embodiments, the method further comprises adjusting the at least one control signal based on a phase angle of the receiving network.

In some embodiments, the method further comprises adjusting the at least one control signal in accordance with a maximum power point tracking strategy.

In some embodiments, the method further comprises applying a system gain to the at least one adjusted control signal to produce at least one further-adjusted control signal, and wherein outputting the at least one adjusted control signal comprises outputting the at least one further-adjusted control signal.

In some embodiments, the at least one adjusted control signal output to the current inverter causes the current inverter to produce unbalanced current as the output current.

BRIEF DESCRIPTION OF THE DRAWINGS

The invention will be described in greater detail with reference to the accompanying drawings, in which.

DETAILED DESCRIPTION

Figure 1:
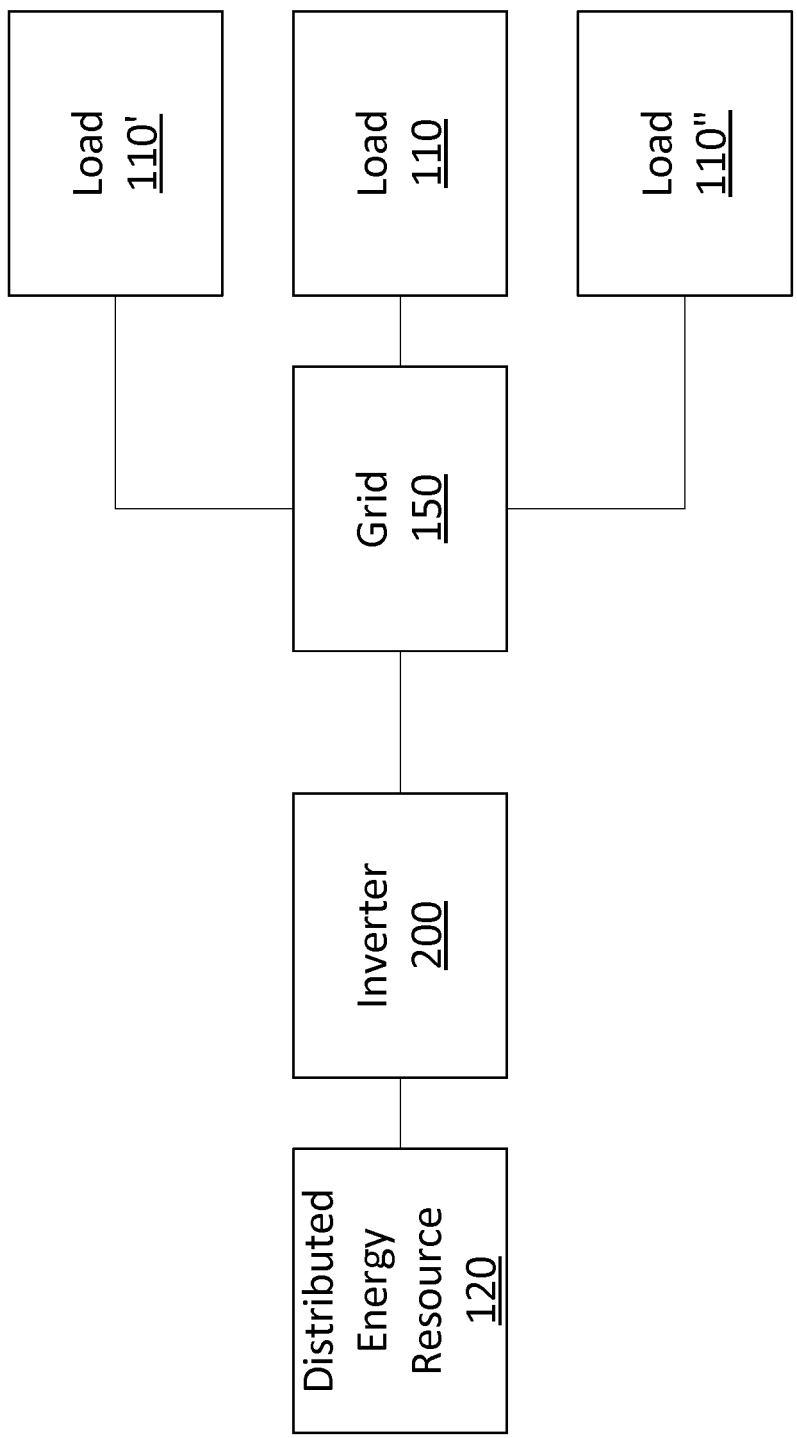
FIG. 1 is a block diagram of an example power distribution network.

With reference to FIG. 1, there is shown a block diagram of an example power distribution network 100. The power distribution network 100 can be used to distribute power between one or more power sources and one or more electrical loads 110, 110', 110" via an electrical grid 150. In the embodiment of FIG. 1, an example power source includes one or more distributed energy resources (DER) 120. The DER 120 can be, for example, a small-scale power generation operation, including one or more windmills or wind turbines, one or more solar panels or solar arrays, one or more watermills or water-powered turbines, one or more geothermal plants, and the like. Other types of DER are also considered, including fuel cells, battery-based storage systems, and the like.

The DER 120 is generally configured for producing direct current (DC) power. However, the grid 150 serves electrical power to the load 110 in the form of alternating current (AC). Thus, in order to provide the electrical power produced by the DER 120 for distribution via the grid 150, the DC power produced by the DER 120 must be converted to AC power. This conversion is performed by a power inverter 200. The power inverter 200 is configured for transforming the DC power into AC power, and for providing the converted AC power to the grid 150, for example for distribution to the load 110.

Figure 2:
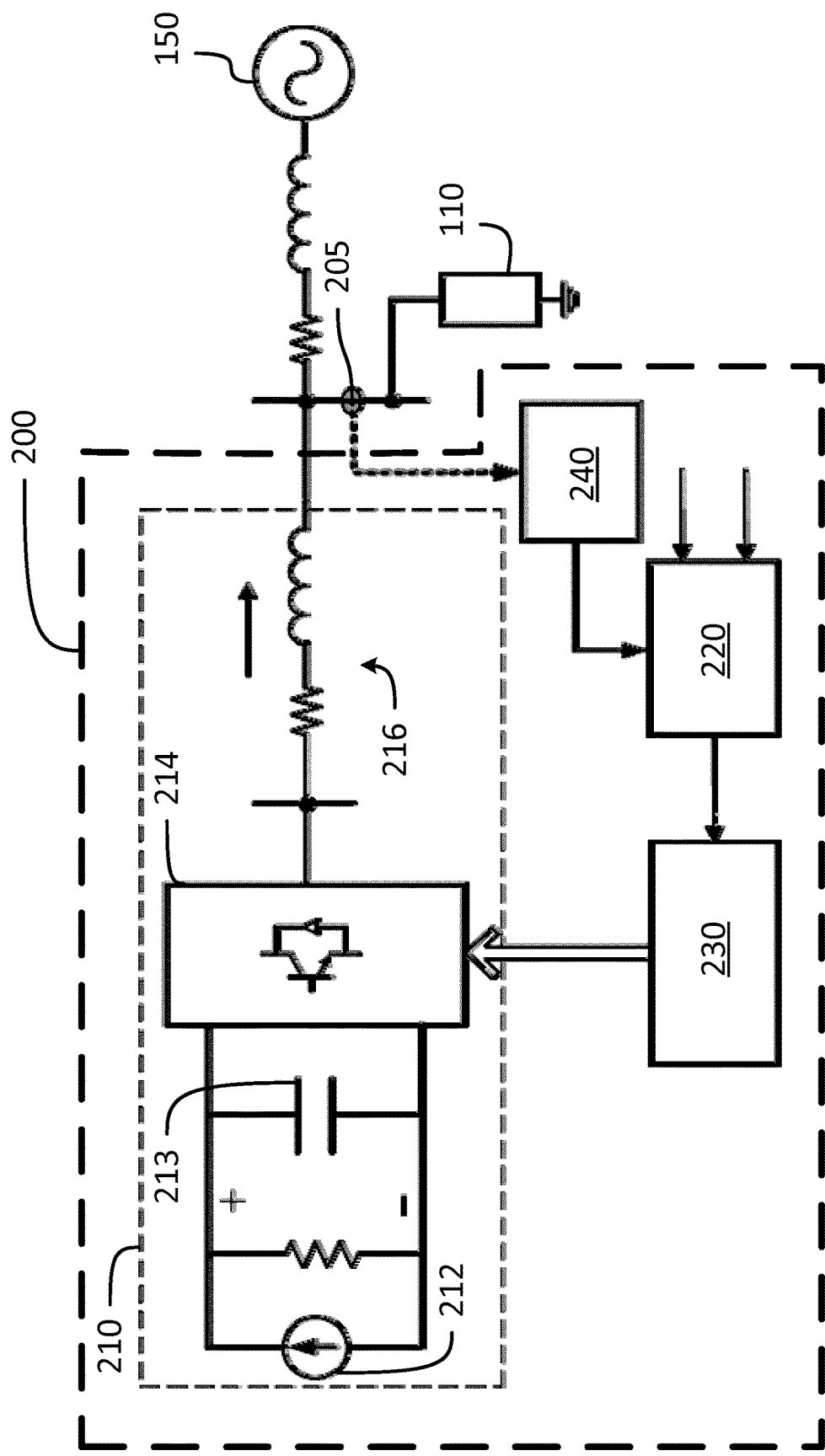
FIG. 2 is a circuit diagram of an example power inverter topology.

With reference to FIG. 2, there is shown a circuit diagram of the inverter 200. The inverter 200 is connected to the grid 150 and to the load 110 at a point of common coupling (PCC) 205. Although FIG. 2 shows only the load 110, it should be noted that any number of loads, including the loads 110' and 110", can also be coupled at the PCC 205. The grid 150 can be any suitable type of grid, including a single-phase grid, a three-phase grid, and the like.

The inverter 200 is composed of an inverter circuit 210, an inverter controller 220, a signal generator 230, and a phase-locked loop (PLL) 240. The inverter circuit 210 shown in FIG. 2 is one example embodiment; other approaches for the inverter circuit 210 are also considered. In this embodiment, the power source 212 feeds DC current to a voltage-source converter (VSC) 214. A capacitor 213 is provided in parallel with the VSC 214 to stabilize output from the power source 212. The power source 212 is a circuit representation of the power produced by the DER 120. The VSC 214 can be composed of a plurality of circuit-switched elements, for example transistors. The VSC 214 is controlled by control signals originating from the controller 220, as described in greater detail hereinbelow, and generates one or more AC signals based on the DC current from the power source 212. The output AC current(s) from the VSC 214 is/are provided to the PCC 205, and can be used by the load 110, distributed via the grid 150, or any suitable combination thereof. In some embodiments, the control signals for the VSC 214 are suitable for causing the VSC 214 to implement a sinusoidal pulse-width modulation (PWM) technique.

In order to control the operation of the switching elements within the VSC 214, the controller 220 of the inverter 200 is configured for issuing control signals to the VSC 214, for example via the signal generator 230. It should be noted that although the controller 220 and the signal generator 230 are shown in FIG. 2 as being separate entities, in some embodiments they can be combined into a single unit. The controller 220 is configured for receiving various inputs, including from the PLL 240 and from the DER 210, which serve as a basis for generating the control signals for the VSC 214. For instance, the PLL 240 is coupled to the PCC 205 for measuring a degree of imbalance in the network indicative of the mismatch between the power supplied by the grid 150 and requested by the loads 110, 110', 110'' and can provide to the controller 220 an indication of the imbalance. In some embodiments, the PLL 240 is a unified three-phase signal processor PLL.

When used to provide power to the grid 150, the DER 120 is operated in a grid-connected mode, where the controller 220 is configured for regulating active and reactive power exchanges. For example, the amount of power injected by the inverter 200 toward the grid 150 can be determined using a maximum power point tracking (MPPT) strategy, or any other suitable approach. In some embodiments, the inverter circuit 210 includes an output filter 216 between the output of the VSC 214 and the PCC 205, which can be an inductance (L) filter or any other suitable type of filter, for instance an LCL filter. In some embodiments, when the LCL filter is used, feedback for the controller 220 is based on the current of the inverter side inductance. In some other embodiments, feedback for the controller 220 is additionally based on the capacitor voltage and/or the grid side inductance current.

Some shortcomings of existing inverter systems include DC ripple effects and double-frequency disturbance signals. Regarding the issue of DC ripple effects, a set of generally-unbalanced system voltages is considered:

$$v_a(t) = V_p \cos(\omega t + \delta_{vp}) + V_n \cos(\omega t + \delta_{vn}) + V_z \cos(\omega t + \delta_{vz})$$

$$v_b(t) = V_p \cos(\omega t + \delta_{vp} - 120) + V_n \cos(\omega t + \delta_{vn} + 120) + V_z \cos(\omega t + \delta_{vz})$$

$$v_c(t) = V_p \cos(\omega t + \delta_{vp} + 120) + V_n \cos(\omega t + \delta_{vn} - 120) + V_z \cos(\omega t + \delta_{vz}) \quad (1)$$

In a three-wire system, no zero-sequence current is considered to flow. The currents for this system can be expressed as $$i_a(t) = I_p \cos(\omega t + \delta_{ip}) + I_n \cos(\omega t + \delta_{in})$$

$$i_b(t) = I_p \cos(\omega t + \delta_{ip} - 120) + I_n \cos(\omega t + \delta_{in} + 120)$$

$$i_c = I_p \cos(\omega t + \delta_{ip} + 120) + I_n \cos(\omega t + \delta_{in} - 120) \quad (2)$$

The real instantaneous power of this system is expressed as $$P(t) = v_{abc}^T i_{abc} = [T_{\alpha\beta 0}^{-1} v_{\alpha\beta 0}]^T \cdot [T_{\alpha\beta 0}^{-1} i_{\alpha\beta 0}]^T \quad (3)$$

where $$T_{\alpha\beta 0} = \frac{2}{3}\begin{bmatrix} 1 & -\frac{1}{2} & -\frac{1}{2} \\ 0 & \frac{\sqrt{3}}{2} & -\frac{\sqrt{3}}{2} \\ \frac{1}{2} & \frac{1}{2} & \frac{1}{2} \end{bmatrix},$$

$$(T_{\alpha\beta 0}^{-1})^T \cdot (T_{\alpha\beta 0}^{-1}) = \frac{3}{2}\begin{bmatrix} 1 & 0 & 0 \\ 0 & 1 & 0 \\ 0 & 0 & 2 \end{bmatrix}$$

Since $i_0 = 0$ in a three wire system, the instantaneous real power can be expressed as $$P(t) = 3/2(v_a i_a + v_\beta i_\beta + 2v_\beta i_0) = 3/2 \, \text{Re}\{v_{\alpha\beta} i^*_{\alpha\beta}\} \quad (4)$$

where $v_{\alpha\beta} = v_\alpha + jv_\beta$ and where $i_{\alpha\beta} = i_\alpha + ji_\beta$.

Using these expressions, the instantaneous real power can be expressed as $$3/2 \, \text{Re}\{(V_p e^{j(\omega t+\delta_{vp})} + V_n e^{-j(\omega t+\delta_{vn})}) \cdot (I_p e^{j(\omega t+\delta_{ip})} + I_n e^{-j(\omega t+\delta_{in})})^*\} = 3/2 \, \text{Re}\{V_p I_p e^{j(\delta_{vp}-\delta_{ip})} + V_n I_n e^{j(\delta_{in}-\delta_{vn})}\} + 3/2 \, \text{Re}\{V_p I_n e^{j(2\omega t+\delta_{vp}+\delta_{in})} + V_n I_p e^{-j(2\omega t+\delta_{vn}+\delta_{ip})}\} = P_0(t) + P_2(t) \quad (5)$$

Thus, the instantaneous power of the system P(t) consists of a constant DC component $P_0(t)$ and a second harmonic (double-frequency) component $P_2(t)$. The peak of the double-frequency component can be found using the first derivative of $P_2(t)$, in this case $$P_2 = \sqrt{V_p^2 I_n^2 + V_n^2 I_p^2 + 2V_p I_n V_n I_p \cos(\delta_{vp} - \delta_{ip} - \delta_{vn} + \delta_{in})} \quad (6)$$

From this equation, it can be observed that $0 \leq \overline{P_2} \leq 3/2(V_p I_n + V_n I_p)$. The maximum for $P_2$ occurs when $\delta_{ip} - \delta_{in} = \delta_{vp} - \delta_{vn}$. The minimum occurs when two conditions are fulfilled $$\frac{I_n}{I_p} = \frac{V_n}{V_p}, \, \delta_{ip} - \delta_{in} = \delta_{vp} - \delta_{vn} + k\pi \quad (7)$$

for any odd value of the integer k.

From this analysis, it is apparent that there should exist a set of unbalanced currents $i_a(t)$, $i_b(t)$, $i_c(t)$ for which real power should be constant, and thus free from ripples.

To address the issue of double-frequency power ripples, the starting consideration is that existing systems require DERs, such as the DER 120, to try to feed balanced current to the grid, that is to say such that the negative-sequence current $I_n = 0$. In this case, the magnitude of the double-frequency power ripple is expressed as $\overline{P_2} = 3/2(V_n I_p + V_p I_n)$.

In traditional systems, the voltage imbalance of the grid is roughly 1 to 5%, for example 2%. This is expressed as $$\gamma_v = \frac{V_n}{V_p} \cong 0.02.$$

Similarly, the current imbalance can be expressed as $$\gamma_i = \frac{i_n}{i_p}.$$

The double-frequency power ripples are caused by the capacitor 213: the peak voltage of the capacitor 213 is expressed as $$\overline{V}_{dc_2} = \frac{\frac{3}{2}(V_n I_p + V_p I_n)}{2\omega V_{dc_0} C} = \frac{3(\gamma_v + \gamma_i) V_p I_p}{4\omega V_{dc_0} C} = \frac{\gamma S}{2\omega V_{dc_0} C} \quad (8)$$

where $V_{dc_0}$ is the DC offset of the DC bus voltage, S is the VA power rating of the DER 120, C is the capacitance of the capacitor 213, and $\gamma=\gamma_v+\gamma_i$, called the aggregated voltage and current imbalance factor.

This expression illustrates a worst-case scenario, namely when current is balanced. In this case, the $\gamma$ term is equal to $\gamma_v$, and the equation can be rewritten as $$\frac{\overline{V}_{dc_2}}{\overline{V}_{dc_0}} = \frac{\gamma}{4\omega H}, \quad H = \frac{\frac{1}{2}CV_{dc_0}^2}{S} \quad (9)$$

where H is analogous to an inertia constant $$\left(\frac{\frac{1}{2}J\omega^2}{S}\right)$$

seen in synchronous machines.

If a numerical analysis of these considerations is performed, it will be observed that in order to have an inertia constant comparable to that of synchronous generator (i.e., between 1 and 10), a very large and impractical capacitor 213 would be required. If such a large capacitor is used, the ripple ratio for double-frequency power ripples will be practically zero. If smaller capacitors are used, for example on the order of 1 millifarad (mF), the inertia constant will be found to be on the order of 10 milliseconds (ms), and the ripple ratio for double-frequency power ripples will be one. However, as described in greater detail hereinbelow, by injecting a certain amount of unbalanced current toward the grid 150, the double frequency ripples can be reduced, avoiding AC harmonics, despite using a smaller capacitor.

Another concern is the generation of harmonics at the AC side of the VSC 214. For a set of balanced currents, the dq currents are considered to be constant. However, for a set of unbalanced and sinusoidal currents, the dq currents have both DC and double-frequency ripples, expressed as $$i_{td}(t) = I_{td_0} + I_{td_2}\cos(2\omega t)$$

$$i_{tq}(t) = i_{tq_0} + i_{tq_2}\sin(2\omega t) \quad (10)$$

where $I_{td_2} = I_{tq_2}$. From these equations, two conditions on the dq current components can be noted. First, the double-frequency ripple components are of equal magnitude. Second, the double-frequency ripple in the q component is 90-degrees phase-shifted with respect to the double-frequency ripple in the d component.

With continued reference to FIG. 2, in order to address both the issues of DC ripples and double-frequency ripples, as well as the issue of AC harmonic generation, the present disclosure proposes, inter alia, that the electrical power provided by the DER 120 to the grid 150 be permitted to be unbalanced, in response to the small level of unbalance existing in the grid voltage. Thus, rather than requiring the inverter 200 to produce balanced current, the inverter 200 is controlled so as to produce current which is slightly unbalanced, yet which reduces the effects of DC and double-frequency ripples. It should be noted that in some jurisdictions, there exist regulations which limit the amount of harmonic-frequency current which can be provided to the grid 150, but no regulations regarding the balance of the current provided. The inverter 200 is thus provided with a device for removing the DC ripple of the DC power produced by the DER 120. The inverter 200, via the controller 220, is also configured for regulating the voltage on the DC side of the inverter 200 to reduce the effect of double-frequency ripples.

Figure 3:
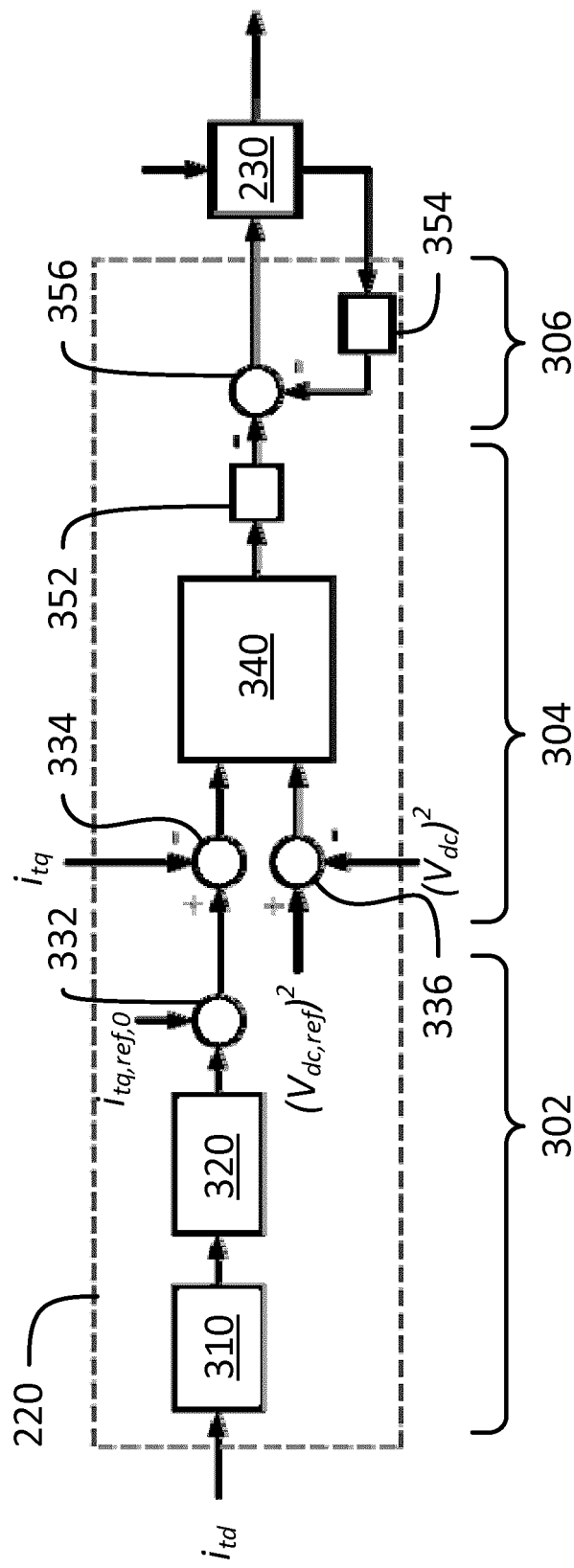
FIG. 3 is a block diagram of an example power inverter controller, according to an embodiment.

With reference to FIG. 3, a block diagram of the controller 220 is shown. The controller 220 includes three subsystems: a reference generator 302, a servo-compensator 304 and a stabilizing state feedback controller 306. The reference generator 302 subsystem comprises a ripple extractor 310, a phase shifter 320, and an adder 332. The servo-compensator 304 subsystem comprises adders 334 and 336, an output controller 340, and a gain block 352. The servo-compensator 304 is responsible for tracking a reference DC voltage and a reactive power reference. The servo-compensator 304 is used to reject second-harmonics and DC ripple effects, as explained hereinbelow. The state feedback controller 306 is composed of gain block 354 and an adder 356. The state feedback controller 304 serves to stabilize the output of the inverter 200 and provide robustness in view of uncertainty in system parameters.

The controller 220 is provided with two reference values via the reference generator 302 subsystem: $V_{dc,ref}^2$, which is provided at an input to adder 336, and $i_{tq,ref}$, which is produced by the adder 332. The reference value $i_{tq,ref}$ is used to provide linearity to the control system. The reference value $i_{tq,ref}$ is produced via the ripple extractor 310, the phase shifter 320, and the adder 332, according to equation (10).

In a first step, $i_{td}$ is passed through the ripple extractor 310 in order to extract the ripple component of i. The ripple extractor 310 can be implemented as a first-order high-pass filter, for example having a transfer function of $$\frac{s}{s+a},$$

where a is a predetermined constant and s is the Laplace-domain variable. In a second step, a 90-degree phase-shift operation is applied to the extracted ripple by the phase shifter 320. The phase shifter 320 can be implemented as a first-order all-pass filter, for example having a transfer function of $$\frac{s-b}{s+b},$$

where b is a predetermined constant. In one particular embodiment, a=50 and $$b = 2\omega\tan\left(\frac{1}{2}\arctan\left(\frac{2\omega}{a}\right)\right),$$

where $\omega$ is the system frequency. The output from the phase shifter 320 is then combined with the initial current value $i_{tq,ref,0}$ via the adder 322 to produce $i_{tq,ref}$.

The servo-compensator 304 subsystem is configured for ensuring that the DC ripple and double-frequency ripple reference signals produced by the reference generator 302 subsystem are followed, in order to remove the DC and double-frequency ripples. The adder 334 is configured for subtracting the current value of $i_{tq}$ from the reference value $i_{tq,ref}$ to produce a first error signal $e_1$. The adder 336 is configured for subtracting the current value of $V_{dc}^2$ from the reference value $V_{dc,ref}^2$ to produce a second error signal $e_2$. The error signals $e_1$ and $e_2$ are then provided to the output controller 340.

In some embodiments, the output controller 340 is a two-input, six-output system which receives the error signals $e_1$ and $e_2$ and produces a set of six state variables. For example, output controller 340 can produce the state variables via matrix operations using a matrix $A_c$ and a vector $B_c$ to implement the characteristic polynomial of two-input, six-output systems:

$$p(s)=s(s^2+4\omega^2) \quad (11)$$

In one such embodiment, the matrix $A_c$ and the vector $B_c$ are generated using core matrices:

$$A_{C_i} = \begin{bmatrix} 0 & 1 & 0 \\ 0 & 0 & 1 \\ 0 & -4\omega^2 & 0 \end{bmatrix}, B_{C_i} = \begin{bmatrix} 0 \\ 0 \\ 1 \end{bmatrix} \quad (12)$$

The output controller can thus, in some embodiments, provide tracking for the set points for the inverter 200 and/or for the reference signals. In some embodiments, the output controller ensures zero-interaction between the control channels of the controller 220 in the steady-state regime.

The gain block 352, with a gain factor denoted $K_c$, serves to combine the state variables of both control channels, that is to say, of the two inputs to the output controller 340, namely $e_1$ and $e_2$. The approach for designing the gain factor $K_c$ is discussed in greater detail hereinbelow.

The stabilizing state feedback controller 306 subsystem serves to stabilize the output of the system. In some embodiments, the stabilizing state feedback controller 306 also serves to damp the response of certain portions of the inverter 200, for instance the output filter 216. The gain block 354, with a gain factor of $K_p$, is indicative of the state of the DER 120. The approach for designing the gain factor $K_p$ is discussed in greater detail hereinbelow. The adder 356 combines the outputs of the gain blocks 352, 354, and provides the output thereof to the signal generator 230, which then produces the control signals for operating the VSC 214.

In some embodiments, the control approach implemented by the controller 220 is a multi-input, multi-output (MIMO) multivariable control approach, unlike traditional approaches which assume a high bandwidth for an inner control loop (i.e. current control) and a slow dynamic for an outer control loop (i.e. DC voltage loop). In some embodiments, the controller 220 is configured to implement fault ride-through standards in accordance with established regulations, for example to ride through various levels of grid unbalance conditions with reduced chances of causing inverter over-currents.

With reference to FIG. 2, in order to determine the values for the gain factors $K_c$ and $K_p$, the control law for the inverter may be used. To determine the control laws, Kirchoff's voltage law can be applied to the AC side of the inverter. The phase-angle obtained by the PLL 240 at the PCC 205 can be used as the reference phase angle for Park transformation purposes. The state-space model of the system can then be defined in terms of state, input, output and disturbance vectors. The complete state-space model of the inverter system can then be defined in terms of the various system parameters. In some embodiments, the model describes a nonlinear control system, but by neglecting the effect of the output filter 216 of the inverter circuit 210, the nonlinearity can be ignored. Other approximations can be made using the PCC 205 phase angle and based on the level of current imbalance in the grid 150. These assumptions and approximations allow AC side of the inverter circuit 210 to be modelled as a linear time-invariant (LTI) model.

With additional reference to FIG. 3, in terms of the system gains, since two gain blocks 352, 354 are part of the controller 220, the entire system gains can be expressed as $K=[K_C \; K_P]$. The state space of the output controller can be determined based on the state space systems for the AC side of the inverter circuit 210, and using the matrices in equation (12). The state space equations for the AC side of the inverter circuit and the controller can be augmented and a total state vector can be defined. From the total state vector, a control law can be written in the form of a full state feedback equation.

Since the reference and disturbance signals belong to the set of signals which are DC and double-frequency sinusoids, an extended derivative transformation can be applied to the total state vector and the control law. Then, the linear quadratic regulator theory can be applied to the transformed total state vector and control law in order to obtain a cost function, which can be minimized using numerical methods. As a result, values for the gains $K=[K_C \; K_P]$ can be obtained. The proposed cost functions directly include the error and its time-derivatives up to the second order. Therefore, the proposed cost functions allow direct minimization of errors leading to efficient and robust gains by the controller 220. In LCL-type filter, the cost function can allow direct active damping of the resonance poles of the LCL filter. In some cases, high robustness of the controller gains allows for a reduction of number of sensors. More specifically, the capacitor voltage and one inductor current may be omitted with minimal or reduced impact on the performance of the controller 220.

Figure 4:
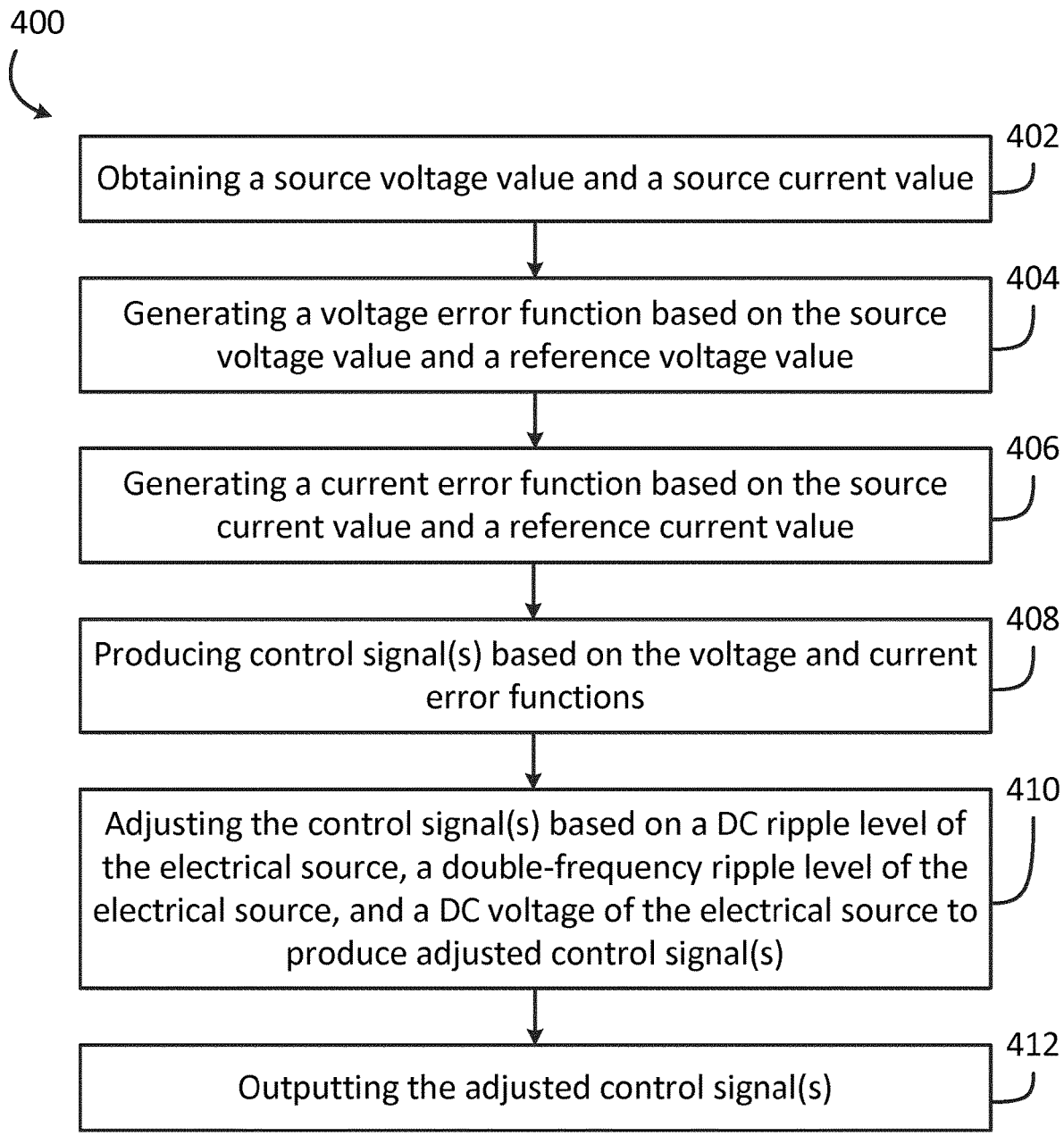
FIG. 4 is a flowchart illustrating a method for controlling a power inverter.

With reference to FIG. 4, at least part of the inverter 200, for example including the controller 220, can be configured for implementing a method 400 for producing output current for a receiving network, for example the grid 150. The inverter 200 is coupled to a power source, for example the DER 120.

At step 402, a source voltage value and a source current value are obtained, for example by the reference generator 302 subsystem. At step 404, a voltage error function is generated based on the source voltage value and a reference voltage value, for example via the adder 334. At step 406, a current error function is generated based on the source current value and a reference current value, for example via the adder 336. At step 408, one or more control signals are produced based on the voltage and current error functions, for example via the output controller 340. At step 410, the control signal(s) is/are adjusted based on various parameters of the DER 120, the grid 150, and/or the inverter 200. For example, a DC ripple level of the electrical source, a double-frequency ripple level of the electrical source, and a DC voltage of the electrical source can be used to adjust the control signal(s), for instance via gain block 352 and 354. At step 412, the adjusted control signal(s) is/are output, for example via the adder 356. The output control signal(s) can then be transmitted, for example, to the VSC 214.

Figure 5A:
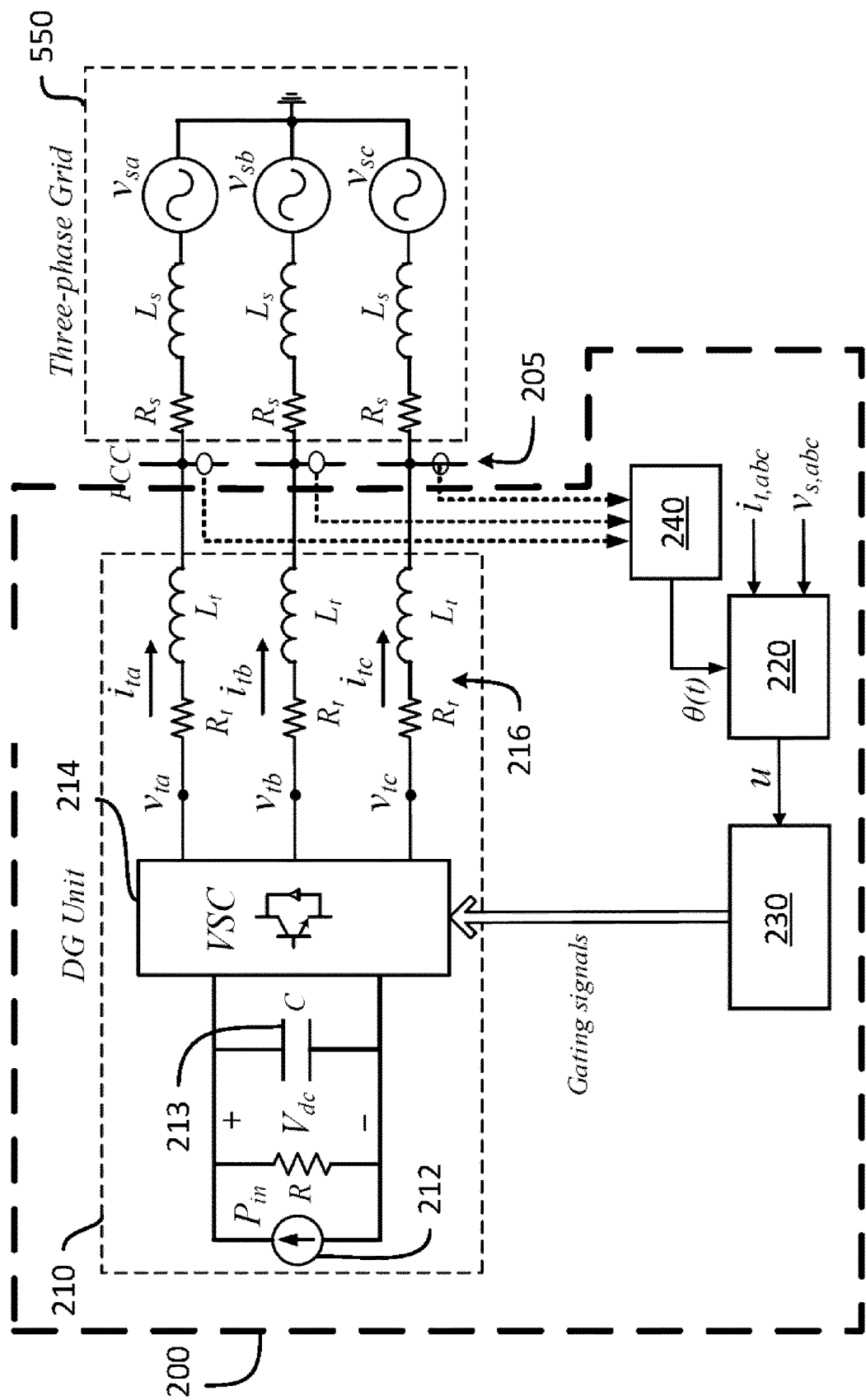
FIGS. 5A-B are circuit diagrams of example power inverter topologies.
Figure 5B:
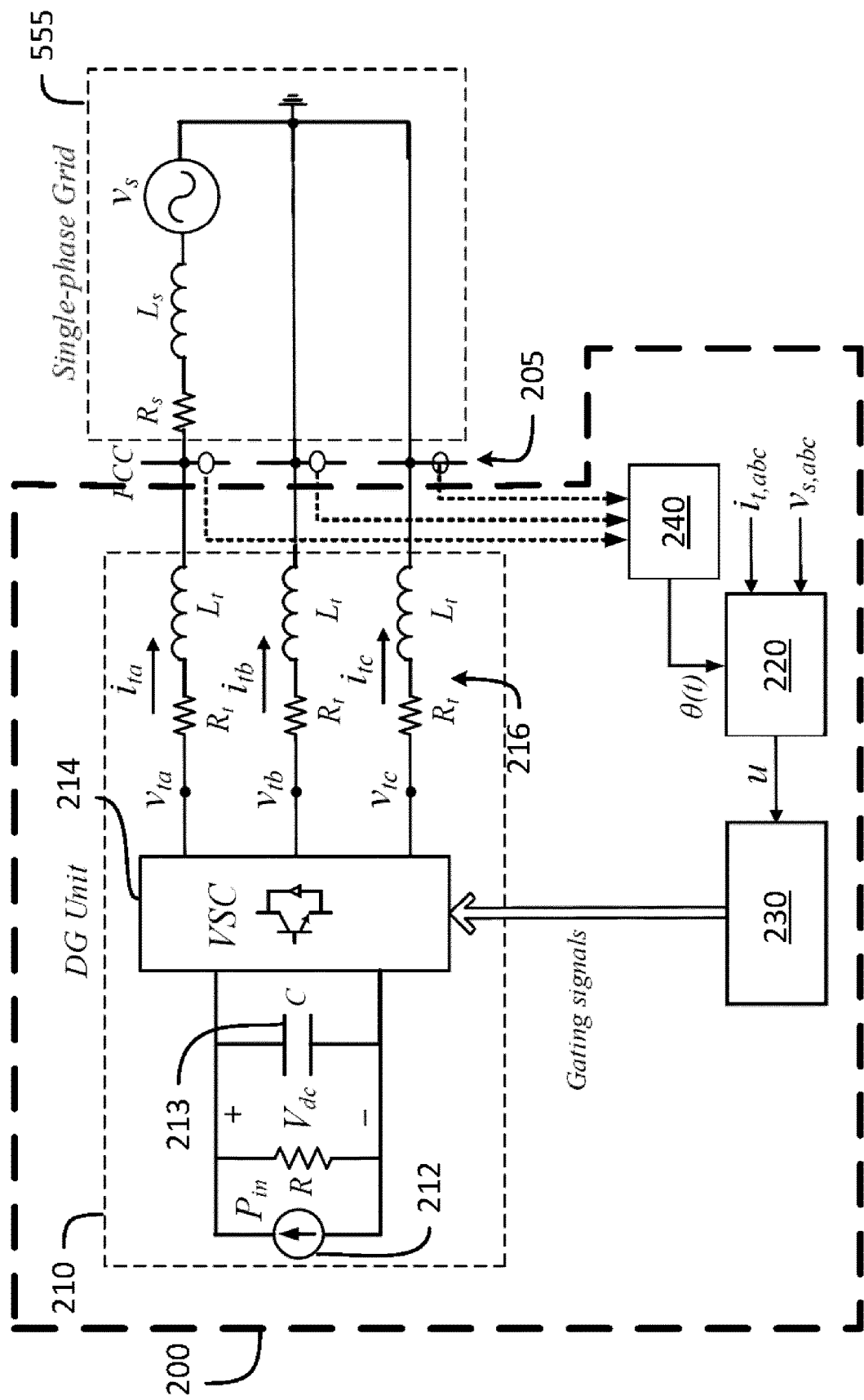

With reference to FIGS. 5A and 5B, the inverter 200 can be used with a three-phase grid 550 or with a single-phase grid 555. In the case of a three-phase grid 550, the PLL 240 can be coupled at one PCC 205 for each of the three phases, and the output filters 216 can be provided on a per-phase basis. In the case of a single-phase grid 555, the PLL 240 is coupled to the PCC 205, and only one output filter 216 is provided. In some cases, the PLL is a unified three-phase processing phase-locked loop.

In accordance with at least some of the embodiments disclosed herein, there is provided an inverter for use with distributed energy resources which provide ripple-free DC-side voltage, require only a small sized DC-side capacitor, produce harmonic-free AC-side current, resulting in reduced power loss and increased power system quality and lifetime, and a robust control structure.

Although the embodiments described herein have primarily focused on use for providing power to a grid, for instance the grid 150, it should be noted that the inverters disclosed herein, including the inverter 200, can also be coupled to a load, for instance a battery of an electric vehicle, or the like.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the disclosed power inverter, and associated systems and methods, may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A controller for a current inverter, the current inverter coupled to an electrical source and producing output current for a receiving network, the controller comprising:
   a reference generator configured for:
      obtaining a source voltage value and a source current value from the electrical source;
      generating a voltage error function based on the source voltage value and a reference voltage; and
      generating a current error function based on the source current value and a reference current;
   an output controller coupled to the reference generator for receiving therefrom the voltage error function and the current error function and configured for producing at least one control signal based on the voltage error function and the current error function; and
   a state feedback controller coupled to the output controller and to the electrical source, the state feedback controller configured for:
      adjusting the at least one control signal, based on a DC ripple level of the electrical source, a double-frequency ripple level of the electrical source, and a DC voltage of the electrical source, to produce at least one adjusted control signal; and
      outputting the at least one adjusted control signal to the current inverter.

2. The controller of claim 1, wherein the reference generator comprises:
   a ripple extractor comprising a first-order high-pass filter having a transfer function of $$\frac{s}{s+a};$$

and
   a phase shift unit comprising a first-order all-pass filter having a transfer function of $$\frac{s-b}{s+b};$$

wherein S is the Laplace-domain variable, and a and b are predetermined constants; and
   wherein the reference current is produced by the ripple extractor and the phase shift unit.

3. The controller of claim 2, wherein the reference current is produced based on the equation $$i_{tq}(t)=i_{tq_0}+i_{tq_2}\sin(2\omega t)$$

in which $i_{tq}$ (t) is the reference current, $i_{tq_0}$ is a base reference current, $i_{tq_2}$ is a feedback current, and $\omega$ is the frequency of the reference current.

4. The controller of claim 1, wherein the reference generator is further configured for producing the reference voltage.

5. The controller of claim 1, wherein the output controller comprises:
   a servo-compensator configured for producing at least one uncompensated control signal based on the voltage error function and the current error function; and
   a gain unit configured for compensating at least one uncompensated control signal based on state variables of the servo-compensator to produce the at least one control signal.

6. The controller of claim 1, wherein the output controller is configured for producing a plurality of control signals based on core matrices $A_C$ and $B_C$ $$A_C = \begin{bmatrix} 0 & 1 & 0 \\ 0 & 0 & 1 \\ 0 & -4\omega^2 & 0 \end{bmatrix}, B_C = \begin{bmatrix} 0 \\ 0 \\ 1 \end{bmatrix}$$

where $\omega$ is the frequency of the reference current.

7. The controller of claim 1, wherein the state feedback controller is further configured for:
   receiving, from a phase-locked loop associated with the current inverter, an indication of the phase angle of the receiving network; and
   adjusting the at least one control signal based on the phase angle of the receiving network.

8. The controller of claim 1, wherein the state feedback controller is further configured for adjusting the at least one control signal in accordance with a maximum power point tracking strategy.

9. The controller of claim 1, further comprising a system gain coupled to the state feedback controller and configured for:
   obtaining the at least one adjusted control signal;
   adjusting the at least one adjusted control signal to produce at least one further-adjusted control signal; and outputting the further-adjusted control signal to the current inverter.

10. The controller of claim 1, wherein the at least one adjusted control signal output to the current inverter causes the current inverter to produce unbalanced current as the output current.

11. A method for controlling a current inverter, the current inverter coupled to an electrical source, controlled by a controller, and producing output current for a receiving network, the method comprising:
obtaining a source voltage value and a source current value;
generating a voltage error function based on the source voltage value and a reference voltage;
generating a current error function based on the source current value and a reference current;
producing at least one control signal based on the voltage and current error functions;
adjusting the at least one control signal based on a DC ripple level of the electrical source, a double-frequency ripple level of the electrical source, and a DC voltage of the electrical source to produce at least one adjusted control signal; and
outputting the at least one adjusted control signal to the current inverter.

12. The method of claim 11, further comprising producing the reference current via a ripple extractor and a phase shift unit.

13. The method of claim 12, wherein producing the reference current comprises producing the reference current based on the equation $$i_{tq}(t)=i_{tq_0}+i_{tq_2}\sin(2\omega t)$$

in which $i_{tq}(t)$ is the reference current, $i_{tq_0}$ is a base reference current, $i_{tq_2}$ is a feedback current, and $\omega$ is the frequency of the reference current.

14. The method of claim 11, further comprising producing the reference voltage.

15. The method of claim 11, wherein producing at least one control signal comprises:
producing at least one uncompensated control signal based on the voltage error function and the current error function; and
compensating the at least one uncompensated control signal based on state variables of a servo-compensator associated with the controller to produce the at least one control signal.

16. The method of claim 11, wherein producing the at least one control signal comprises producing a plurality of control signals based on core matrices $A_C$ and $B_C$ $$A_C = \begin{bmatrix} 0 & 1 & 0 \\ 0 & 0 & 1 \\ 0 & -4\omega^2 & 0 \end{bmatrix}, B_C = \begin{bmatrix} 0 \\ 0 \\ 1 \end{bmatrix}$$

where $\omega$ is the frequency of the reference current.

17. The method of claim 1, further comprising adjusting the at least one control signal based on a phase angle of the receiving network.

18. The method of claim 11, further comprising adjusting the at least one control signal in accordance with a maximum power point tracking strategy.

19. The method of claim 11, further comprising applying a system gain to the at least one adjusted control signal to produce at least one further-adjusted control signal, and wherein outputting the at least one adjusted control signal comprises outputting the at least one further-adjusted control signal.

20. The method of claim 11, wherein the at least one adjusted control signal output to the current inverter causes the current inverter to produce unbalanced current as the output current.

* * * * *